(12) United States Patent
Nagafuchi

(10) Patent No.: US 6,203,874 B1
(45) Date of Patent: *Mar. 20, 2001

(54) COPYING SHEET

(75) Inventor: Kazumasa Nagafuchi, Hyogo-ken (JP)

(73) Assignee: Kisokaseisangyou Co., LTD, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/477,795

(22) Filed: Jun. 7, 1995

(51) Int. Cl.[7] ........................................................ B32B 3/26
(52) U.S. Cl. ........................ 428/41.8; 428/145; 428/159; 428/317.1; 428/319.3; 428/339; 428/343
(58) Field of Search ................................. 428/317.1, 41.8, 428/319.3, 145, 343, 159, 339

(56) References Cited

U.S. PATENT DOCUMENTS

| | | | |
|---|---|---|---|
| 5,047,383 | * 9/1991 | Hayashi et al. | 503/200 |
| 5,437,917 | * 8/1995 | Ohe et al. | 428/211 |
| 5,747,174 | * 5/1998 | Kimura et al. | 428/480 |

* cited by examiner

Primary Examiner—Blaine Copenheaver
(74) Attorney, Agent, or Firm—John F. A. Earley; John F. A. Earley, III; Harding, Earley, Follmer & Frailey

(57) ABSTRACT

A copying sheet comprising a printing film made of a synthetic resin film and a base film made of a foamed polyester resin film releasably adhering to the printing film, the printing film having formed on the front surface thereof a matting material layer and an antistatic agent layer, the matting material layer including silica having the average particle size of less than 5 microns and having a thickness of 0.5 to 10 microns for the purpose of fixing the powders of towner, the base film having formed on the back surface thereof a matting material layer and an antistatic agent layer, the matting material layer including silica having the average particle size of 3 to 10 microns and having the thickness of 7 to 15 microns for the purpose of preventing copying sheets from being sent out of a copier as two or more sheeting being superposed.

6 Claims, 1 Drawing Sheet

COPYING SHEET

TECHNICAL FIELD

This invention relates to a copying sheet having a front surface on which powders of toner are to be fixed after having been fused by heating.

PRIOR ART

Formerly, copying sheets were made of a synthetic resin film or a composite film comprising a printing film and a base film releasably affixed to the back surface of the printing film. However, electrophotographic copiers, page printers, laser printers etc., wherein powders of toner were fused by heating and fixed on the front surface of the printing film, were recently miniaturized and became to be operated at high temperature and at high speed. Besides, in color electrophotographic copiers the powers of toner were heated for a comparatively long time. As a result, conventional copying sheets often curled or wrinkled. Especially, copying sheets made of the composite film had a notable tendency to curl or wrinkle.

SUMMARY OF THE INVENTION

An object of the present invention is to provide a copying sheet which does not curl nor wrinkle, when it is heated at a high temperature or for a comparatively long time so that powders of the toner may be fixed on its front surface.

Another object of the invention is to provide a copying sheet which is capable of saving the quantity of pigments such as titanium white to be added to whiten the sheet, and which is capable of reducing the cost of raw materials per square meter of the copying sheet.

In accordance with the foregoing objects, the present invention provides a copying sheet comprising a printing film made preferably of polyester film and a base film made of a foamed polyester film which is preferably a foamed polyethylene terephthalate film.

Referring to polyester films, there are "Viedene"-film (registered trademark), "Scotchpack"-film (registered trademark), "Kodar"-film (registered trademark) etc. other than polyethylene terephthalate film. And their foamed films are pliable and resilient, and have high tensile strength and high tearing strength.

For the purpose of measuring the break strength, break elongation and Young's Modurus of the foamed polyethylene terephthalate film having the specific gravity of 1.0, four specimens were made from respective foamed polyethylene terephthalate films having the thickness of 50, 75, 100 or 125 microns. Then, with respect to each specimen, the break strength, break elongation and Young's modulus were measured. Results of the measurement were shown in the following table.

TABLE

| Testing Items | Measuring Direction | Thickness (microns) | | | | Measuring Method |
|---|---|---|---|---|---|---|
| | | 50 | 75 | 100 | 125 | |
| Break Strength (kg/mm$^2$) | Longitudinal | 11 | 11 | 11 | 11 | JISC2318 |
| | Transveral | 11 | 10 | 10 | 10 | JISC2318 |
| Break Elongation (%) | Longitudinal | 100 | 100 | 100 | 100 | JISC2318 |
| | Transversal | 60 | 70 | 70 | 70 | JISC2318 |

TABLE-continued

| Testing Items | Measuring Direction | Thickness (microns) | | | | Measuring Method |
|---|---|---|---|---|---|---|
| | | 50 | 75 | 100 | 125 | |
| Young's Modulus (kg/mm$^2$) | Longitudinal | 250 | 270 | 270 | 270 | ASTMD882 |
| | Transversal | 260 | 280 | 280 | 280 | ASTMD882 |

In the present invention, it is preferable that the foamed polyester film has the thickness of 50 to 200 microns. If the thickness is less than 50 microns, it is feared that the tensile strength and the tearing strength of the copying sheet become weak, though the pliability of the copying sheet is sufficient. While, if the thickness is more than 200 microns, it is feared that the pliability of the copying sheet becomes insufficient.

As to the matting material, for the purpose of asisting the powders of toner to be fixed, it is preferable that silica having the particle size of less than 5 microns is used, while for the purpose of preventing copying sheets from being sent out of a copier as being superposed, it is preferable that silica having the particle size of 3 to 10 microns is used. If silica having the particle size of more than 10 microns, it is feared that silica easily falls away.

As to the thickness of the matting material layer, it is preferable that the thickness of the layer is within a range of 0.5 to 10 microns for the purpose of fixing the powders of toner, while it is preferable that the thickness of the layer is within the range of 7 to 15 microns for the purpose of preventing copying sheets from being sent out of a copier as being superposed.

The matting material may be coated with a solution of coating resins, or may be scattered after a solution of coating resins has been coated, on the front and back surfaces or the back surface of the copying sheet. When the matting material is coated with the solution of coating resins, the matting material may be mixed within the range of 10 to 500 grams per 1 kilogram of the solution.

As to the antistatic agents, conventional antistatic agents can be used in the invention.

As to the adhesives, adhesives having high heat resistance, for example, acrylic resin adhesive etc. are used in the invention.

As to the releasing agents, it is preferable that silicon resin is used in the invention.

BRIEF DESCRIPTION OF THE DRAWINGS

The invention will be described in detail according to embodiments with reference to the accompanying drawing.

In the drawing.

EXAMPLE 1

Figure 1:
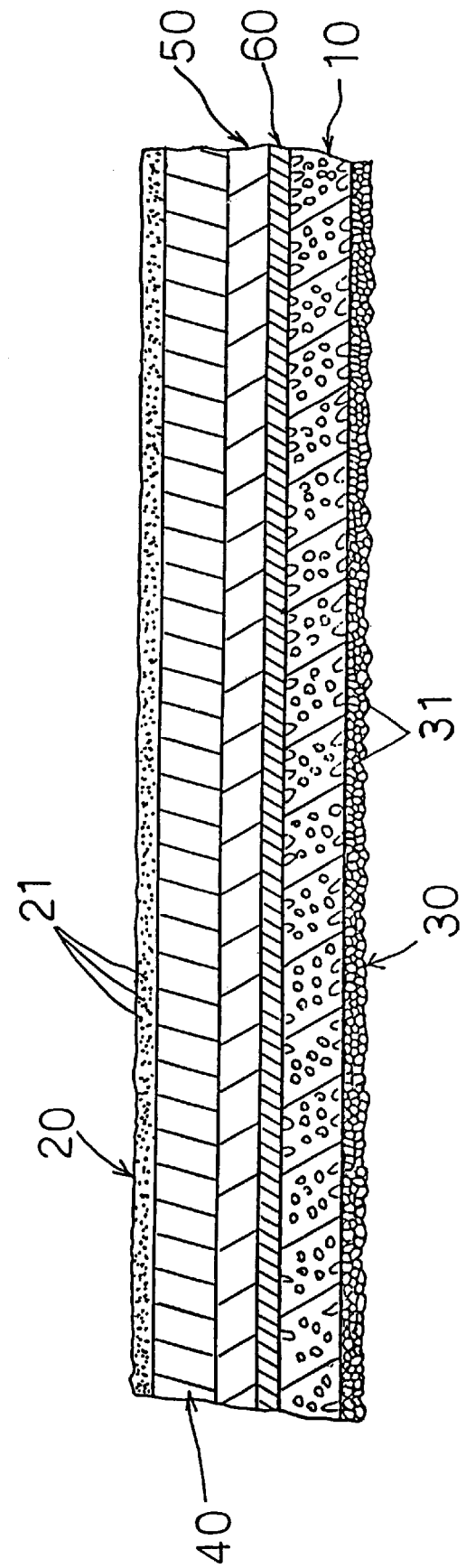
FIG. 1 is an enlarged fragmentary sectional view of an embodiment of the copying sheet according to the invention.

The copying sheet according to Example 1 is a composite film comprising a printing film and a base film.

The printing film comprised a polyethylene terephthalate film 40 having the thickness of 75 microns. After a resin coating of unsaturated polyester resin which includes an antistatic agent and silica 21 having the average particle size of 2 microns has been made on the front surface of the film 40 to form a matting material layer 20 having an average thickness of 40 microns, while an acrylic resin adhesive layer 50 having the average thickness of 30 microns was made on the back surface of the film 40.

The base film comprised a foamed polyethylene terephthalate film 10 having the thickness of 100 microns, and a releasing layer 60 of silicon resin releasing agent having the average thickness of 0.1 microns was coated on the front surface of the foamed film 10 so that the base film may releasably adhere to the adhesive layer 50, while unsaturated polyester resin silica 31 having the average particle size of 8 microns was coated on the back surface of the paper like foamed film 10 to form a matting material layer 30 having the average thickness of 10 microns.

EFFECT OF THE INVENTION

Since the copying sheet according to the invention comprises a foamed polyester film as a base film, the sheet does not curl nor wrinkle because of the effect of heat insulation of the foamed polyester film, even if the sheet is heated at a high temperature or for a comparatively long time. If a portion of the copying sheet is made of a conventional printing film, releasing agent layer or adhesive layer, and even if the portion is affected so as to curl or wrinkle, the copying sheet does not curl nor wrinkle, because the foamed polyester film does not curl nor wrinkle.

Besides, when the copying sheet according to the invention is sent out of an electrostatic copier, page printer or laser printer at a high speed, the copying sheet never curl nor wrinkle. Accordingly, it never happens that the copying sheets are blocked up in or sent out of electrostatic copiers, page printers, laser printers etc. as two or more than two of the copying sheets being superposed.

Furthermore, the copying sheet according to the invention can be easily whitened or made opaque because of the foamed polyester film being used. So that it is possible to reduce the coat of pigments such as titanium white, as compared with the case of transparent plastic films being used. Also, since the foamed polyester film is light, it is possible to save film materials to reduce the coat.

I claim:

1. A copying sheet comprising a printing film and a base film made of a foamed polyester film, said printing film having a front surface coated with an antistatic agent or an antistatic agent and a matting material comprising silica having an average particle size of about 2 microns and a back surface coated with an adhesive, said base film having a front surface coated with a releasing agent and a back surface coated with a coating solution which includes an antistatic agent or an antistatic agent and a matting material comprising silica having an average particle size of about 8 microns.

2. A copying sheet as claimed in claim 1, wherein the printing film is made of a polyester film.

3. A copying sheet comprising a printing film and a base film having a thickness of about 75 microns made of a foamed polyester film, said printing film having a front surface which is coated with an antistatic agent after having been coated with a coating solution including a matting material comprising silica having an average particle size of about 2 microns, said base film having a front surface coated with a releasing agent and a back surface which is coated with an antistatic agent after having been coated with a coating solution including a matting material comprising silica having an average particle size of about 8 microns and an average thickness of about 10 microns.

4. A copying sheet as claimed in claim 3, wherein the printing film is made of a polyester film.

5. A copying sheet comprising a printing film made of a synthetic resin film and a base film made of a foamed polyester resin film releasably adhering to the printing film,
wherein said printing film has formed on the front surface thereof a matting material layer or a matting material layer including an antistatic agent, and has formed on the back surface thereof an adhesive layer for releasably adhering to the front surface of the base film, wherein said matting material layer includes silica having the average particle size of less than 5 microns and has the thickness of 0.5 to 10 microns for the purpose of fixing the powders of toner,
wherein said base film has formed on the front surface thereof a releasing agent layer for adhering releasably to the adhesive layer of the printing film, and has formed on the back surface thereof a matting material layer and an antistatic agent layer formed on the matting material layer or a matting material layer including an antistatic agent, and wherein said matting material layer of the base film includes silica having the average particle size of 3 to 10 microns and has the thickness of 7 to 15 microns for the purpose of preventing coyping sheets from being sent out of a copier as two or more sheets being superposed.

6. A copying sheet as claimed in claim 5, wherein the foamed polyester resin film is a foamed polyethylene terephthalate film.

* * * * *